J. A. SINGMASTER & F. G. BREYER.
ZINC LEAD PIGMENT.
APPLICATION FILED OCT. 26, 1917.
1,257,136. Patented Feb. 19, 1918.
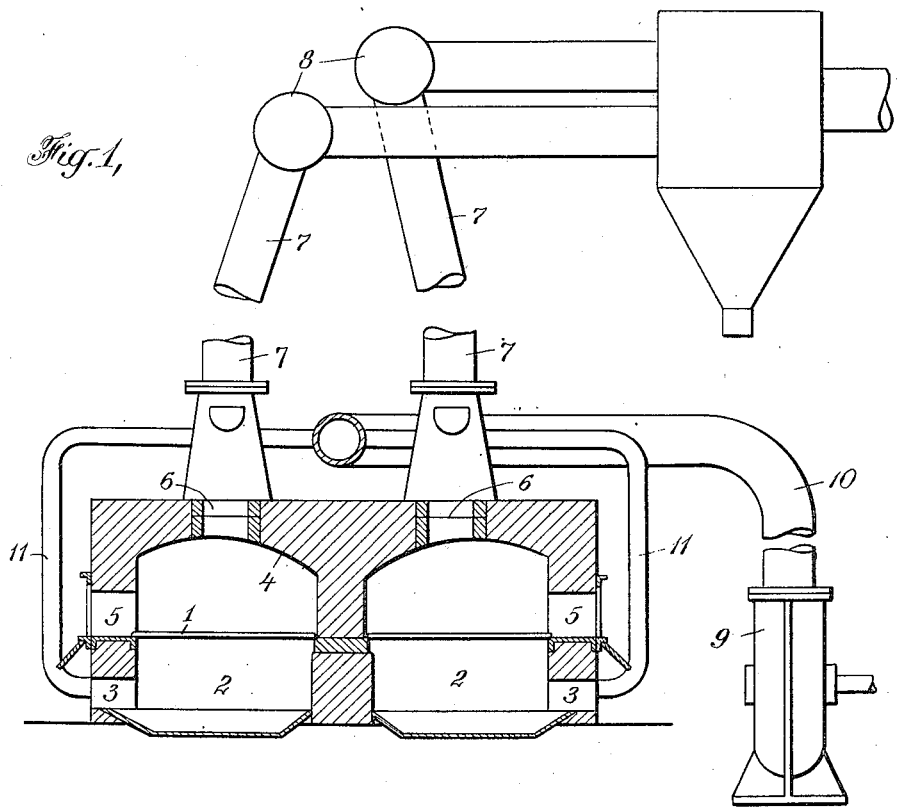
Fig. 1.
Fig. 2.
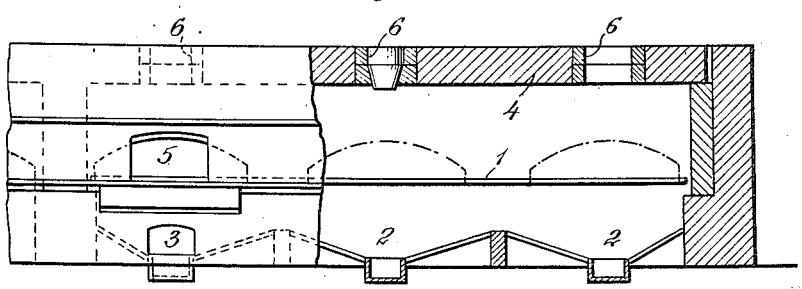
James G. Singmaster
Frank G. Breyer
Inventors
By their Attorneys
Pennie Davis Marvin & Edmonds

UNITED STATES PATENT OFFICE.

JAMES A. SINGMASTER AND FRANK G. BREYER, OF PALMERTON, PENNSYLVANIA, ASSIGNORS TO NEW JERSEY ZINC COMPANY, OF NEW YORK, N. Y., A CORPORATION OF NEW JERSEY.

ZINC-LEAD PIGMENT.

1,257,136.  Specification of Letters Patent.  Patented Feb. 19, 1918.

Continuation in part of application Serial No. 172,635, filed June 4, 1917. This application filed October 26, 1917. Serial No. 198,717.

*To all whom it may concern:*

Be it known that we, JAMES A. SINGMASTER, a citizen of the United States, residing in Palmerton, Carbon county, Pennsylvania, and FRANK G. BREYER, a citizen of the United States, residing at Palmerton, Carbon county, State of Pennsylvania, have invented certain new and useful Improvements in Zinc-Lead Pigments; and we do hereby declare the following to be a full, clear, and exact description of the invention, such as will enable others skilled in the art to which it appertains to make and use the same.

This invention relates to improvements in the production of zinc-lead pigments, said pigments containing a large amount of zinc oxid as compared with the amount of lead compounds present, the zinc oxid generally exceeding say 35% and preferably being in preponderating proportion, even up to a range of 65% to 97% of zinc oxid. The improved product of our invention is characterized by improved body or oil-absorbing capacity, and by superior whiteness.

The manufacture of pigments from ores containing both zinc and lead has been the subject-matter of extended investigations. In manufacturing by the methods heretofore used, the body or oil-absorbing capacity and the hiding power of the resulting pigments is seriously affected by the presence of the lead compounds, even when the percentage of lead in the ore is relatively low. With ores containing high percentages of lead, the pigment produced is similarly affected as to its body or oil-absorbing capacity and hiding power, and, in addition, generally has a pinkish tint which is quite pronounced and which precludes the use of the pigment, for certain colors, in the pigment trade. The deleterious effect of the lead in such pigments has resulted in a materially lower price for such pigments as compared with pigments substantially free from lead.

We have found that a zinc-lead pigment of improved body or oil-absorbing capacity and hiding power can be produced by combining with the pigment, at the time of its production, regulated amounts of sulfur trioxid, as hereinafter described, and that, along with the improvement in the body or oil-absorbing capacity and hiding power, there can likewise be accomplished an improvement in the color of the pigment.

We have further ascertained, by investigating various pigment fractions produced at different stages of the pigment producing operation, that those fractions having a good body or oil-absorption capacity and hiding power, and which were not overheated, showed a higher ratio of sulfur compounds to lead than similar pigments of pronounced pink tint, and that such products were practically free from any pronounced pink color. Over heating of the pigment destroys to a large extent the pink color, but substitutes a yellow instead, and leaves the pigment granular and gritty and with but poor oil-absorbing capacity and hiding power.

Our investigations have led us to the conclusion that the common method of manufacturing pigments from roasted ores containing zinc and lead, in which the bulk of the zinc and lead are oxidized over the charge in a semi-oxidizing atmosphere is incorrect; and that, by carrying out the operation in a regulated sulfatizing atmosphere, *i. e.* combining sufficient sulfur trioxid with the fume to sulfatize the lead to the desired extent and yet not sulfatize the zinc to a harmful degree, a product can be produced which will have an improved body or oil-absorbing capacity and hiding power and which will also be free from pronounced and objectionable pink tints.

We have found that the maintenance over the charge of an atmosphere containing regulated amounts of sulfur trioxid sufficient to sulfatize the lead to the required extent without materially sulfatizing the zinc is important for the manufacture of a pigment of improved body or oil-absorbing capacity and hiding power and in which the lead will be present as a white compound free from any pronounced and objectionable pink tint; and we have also found that it is important to prevent such over-heating or prolonged heating of the pigment after its production, as is incident to the usual practice of passing the fumes on their way to the cooling flues through brick flues or so-called combustion chambers intermediate of the furnace chamber and the cooling flues. We have also found that the white compounds of lead thus produced give to the pigment a higher oil-absorbing capacity or body and hiding power than is the case when the pronounced pinkish color is present. The product is thus benefited in the direction of its body or oil-absorbing capacity and hiding power and in the direction of its color.

The present invention accordingly comprises a mixed zinc-lead pigment of improved body or oil-absorbing capacity and hiding power, and also of improved color. It also comprises a process of producing such a pigment from charges comprising oxidized ores containing both zinc and lead, by volatilizing the zinc and lead and subjecting the same to regulated oxidizing and sulfatizing atmosphere, or to the action of gases containing sulfur trioxid, and thereby introducing a regulated amount of sulfur trioxid into the fume or zinc-lead product to convert the same into a white pigment of improved body hiding power and color.

Among the zinc-lead ores available for purposes of the present process may be mentioned the following: lead-carrying natural oxids, silicates and carbonates of zinc or mixtures thereof, and artificial oxids such as partially or completely roasted zinc sulfids, calcined zinc carbonates, spelter retort residues, zinc fumes, skimmings, "cadmia" and the like, all of which may be included in the general term "oxidized ores".

In the practice of the invention, the sulfatizing action should persist throughout the entire operation of the pigment production. This sulfatizing action is by no means as simple as might be expected. Thus we have found that pyrite, while beneficial if added to the charge, tends to yield its sulfur before the charge is entirely worked off and therefore a single addition of pyrite at the outset does not improve the entire pigment product from a given charge. Elemental sulfur, which is perhaps the most convenient source of sulfatizing agent, is similarly found to burn off quickly, giving an excess of sulfur at the beginning and not enough at the end of the operation. In order that the desired sulfatizing action may take place throughout the operation, it is important that the sulfatizing compounds be of such a nature, or be added in such a manner, that they will furnish the required amount of sulfur trioxid throughout the entire operation of the charge.

The present invention accordingly comprises a process in which the sulfatizing compounds are present in regulated amounts throughout the operation of the charge and in which the conditions are maintained such that enough of the sulfur trioxid is combined with the fume to give to the product the improved body or oil-absorbing capacity and hiding power. In order that the desired action may take place, it is also important that oxidizing conditions be maintained so that the atmosphere will be both oxidizing and sulfatizing. The maintenance of this sulfatizing atmosphere can be accomplished in various ways, as, for example, by the incorporation of a suitable sulfid in the charge, such as zinc blende or galena, in proper amount; by the addition of gases containing sulfur trioxid to the combustion zone, for example, by dropping in liquid sulfuric acid or by introducing a mixture of sulfur dioxid and sulfur trioxid; or by the addition of elemental sulfur or of other sulfur compounds in such manner as to maintain the sulfatizing atmosphere continuously during the pigment-making operation.

When the sulfatizing atmosphere is obtained by the addition of a sulfid to the charge, this sulfid may, for example, be raw ore in which the sulfur is present principally as blende or galena. The amount and limits of sulfur which can be added in this form vary somewhat for different ores but will remain within a comparatively narrow range for any particular ore. The addition of too much sulfur is objectionable in that zinc sulfate is formed and the product will also hold excessive amounts of other sulfur compounds which are usually objectionable in the product. On the other hand, if too little sulfur is present in the charge, as is the case with the ordinary roasted ores, without added sulfur material, an inferior product is obtained.

Instead of adding raw sulfid ore, such as blende or galena, to the charge, the correct amount of sulfur in the charge can be obtained by roasting the ore only partially and leaving in it an amount of sulfur necessary for maintaining the desired sulfatizing atmosphere. Such amounts of sulfur in roasted ores are commonly considered objectionable and for that reason are avoided, as it has been the prevailing opinion that a high sulfur content in the roasted ore was extremely deleterious. Nevertheless, while the prevailing practice has been to obtain a roasted product with the sulfur content decreased as much as possible, we have found that by retaining a sufficient amount of sulfur in the ore the necessary sulfatizing atmosphere can be maintained throughout the pigment-forming operation, without the addition of further amounts of unroasted ore or other sulfur compounds. Where, however, the ore has been roasted in the usual way to a low sulfur content, the sulfatizing atmosphere can be maintained, as above indicated, by the addition, for example, of raw sulfid ore, or other sulfur compounds to the charge.

Where naturally occurring ores are partly oxidized, or are made up in part of sulfids and in part of oxidized or other non-sulfid constituents, these ores can similarly be used. If such ores contain the proper amount of sulfur, no further additions will be necessary. If, however, such ores contain too little or too much sulfur, due allowance will be made therefor in making up the charge.

Instead of adding sulfids to the charge, the sulfatizing atmosphere can be maintained by the addition of sulfuric acid in regulated amount to the hot gases and fumes in the combustion zone during the entire working period. When the acid is added by dropping it into the furnace or bringing it into contact with the furnace gases, we have found it of advantage to prevent too great decomposition of the sulfur trioxid fumes by maintaining an excess of air and oxygen in the combustion zone. Without an excess of oxygen in the combustion zone, and particularly at the high temperatures prevailing there, the sulfur trioxid tends to be decomposed to such an extent that the desired sulfatizing action is prejudiced. It is accordingly of advantage to have not only a proper ratio of sulfur trioxid to lead in the combustion zone, but also a high ratio of oxygen to sulfur. The product obtained in this way has been found to be of good body and hiding power and free from grit and granulation. It is also of a good color and without objectionable amounts of soluble zinc sulfate.

When raw sulfid ore is added to the charge to supply the necessary amount of sulfur trioxid, some of the sulfur is given off by the unroasted ore quickly, and to allow for this, it is accordingly necessary to increase the amount of sulfur added in this way until the amount is sufficient to maintain the desired sulfatizing atmosphere throughout the operation. We have obtained a product of excellent body and good color with a ratio of fifty parts by weight of total sulfur (in the form of sulfid or roasted sulfid ore) to sixty parts of lead oxid (PbO) in the charge, and with the furnace doors wide open to secure a sufficiently high ratio of oxygen as well as a proper ratio of sulfur trioxid to lead.

Where the ore is roasted only to an extent which will leave sufficient sulfur to supply the sulfatizing atmosphere, a similar ratio of sulfur to lead oxid to that above indicated may be left in the roasted material, e. g., approximately eight to ten per cent. by weight of sulfur in an ore containing a similar or slightly larger per cent. of lead oxid. This method of light-roasting sulfid ores has also been found a satisfactory method of producing a furnace charge suitable for obtaining a product of the desired qualities.

In carrying out the process in the manner described, we have varied the ratio of lead to sulfur in the charge from about three parts of sulfur to six parts of lead oxid (PbO) up to about eight parts of sulfur to six parts of lead oxid, depending on the nature of the ore being worked. These figures, however, represent about the outside limits for good practice, as below the lower ratio the pink tint tends to appear, and, if too pronounced, becomes objectionable, while above the upper ratio the zinc sulfate and occluded or otherwise retained sulfur compounsd tend to become objectionable.

The product produced in the manner described is free from the usual objections (lack of body hiding power and whiteness) and possesses qualities which have led to its being recognized as a superior product upon the market. It can be maintained of uniform qualities, and particularly as to those qualities which make it valuable as a pigment material.

In the manufacture of this product, the common pigment furnaces can be used,—for instance of the blast-furnace type, or of the Wetherill grate-furnace type, as well as other furnaces where the zinc and lead are volatilized from the charge and thereupon oxidized, provided the product is promptly withdrawn from the region of elevated temperatures after its formation and not subjected to prolonged or objectionable heating, or to subsequent objectionable retention at elevated temperatures. In such furnaces, there should be maintained an oxidizing and sulfatizing atmosphere in the combustion or oxidizing zone. This sulfatizing atmosphere, as above pointed out, can be maintained in various ways, such as by the addition of sulfur compounds to the charge which continuously yield sulfur trioxid to the furnace atmosphere coincidentally with the driving off of the zinc and lead; or by the addition of sulfur trioxid, or compounds yielding sulfur trioxid, in predetermined and regulated quantities to the gases in the combustion zone.

In order to illustrate suitable means for practising the invention it will be described, in connection with the accompanying drawings, as carried out in a furnace of the Wetherill type.

In the accompanying drawings,

Figure 1 shows in section, a typical pigment furnace block, and

Fig. 2 shows a partial section and partial elevation of one of the furnaces of the block.

The furnace is of the type developed from the original Wetherill grate furnace. The furnace chamber has the shape indicated in the section of Fig. 1, which is a section taken at right angles to the longest dimension. Each furnace has the flat horizontal grate 1 composed of heavy cast iron sections with slot perforations to permit of the passage of air through them. Beneath the grate are ash pits 2 where the material falling through the grate accumulates and is removed from time to time through suitable ash pit doors 3. The furnace is commonly constructed of fire brick within and red brick, without and provided with the usual stays and supports (not shown). The capacity of the furnace is determined by the area of the grate. This grate may, for example, have a length of about 19½ feet and a width of about 6 feet, the top of the arch 4 being about three feet above the top of the grate. Each of the furnaces illustrated has three arched charge doors 5 through which the firing coal and mixed charge are spread upon the grate after being dumped down through suitable holes 6 in the top of the furnace, provided for this purpose. Two of the three holes in the arch are also provided with down-legs or pieces of pipe 7 connecting the furnace with the exhaust drums 8 arranged above the furnace. The exhaust drums are in turn connected by pipes with an exhaust fan (not shown) which exhausts the fume laden gases from the furnace through the upright pipes 7 and from the drum and forces them over into a suitable bag house (not shown).

A centrifugal fan 9 furnishes air which is blown into the ash pits under the grates through the pipes 10 and 11. This air forces its way up through the grate, combusts the coal and reduces, volatilizes, and partially oxidizes again, the zinc, lead and other volatile constituents.

In order to illustrate the practice of the process of the invention, and the production of the novel product of the invention, the progress of a typical charge through the furnace will be described.

Assuming the fire brick of the furnace to be incandescent within, after the removal through the charge doors 5 of the clinker from the previous charge, 200 pounds of firing coal is thrown in each charge door, or a total of 600 pounds of firing coal per furnace, and this coal is scattered evenly over the grate. The firing coal consists of fine anthracite known in the trade as mixtures of #2, #3, and #4 Buck. The charge doors are then closed with a sheet iron cover and the firing coal allowed to ignite from the heat of the incandescent arch.

When the firing coal is ignited, air is admitted into the ash-pits and starts a further rapid combustion of the firing coal. From one hundred to two hundred pounds of slate of #1 Buck or pea size, for each charge door, is then thrown upon the top of the firing coal. The charge is then dropped down through the holes provided in the arch and spread out evenly over the well ignited bed.

The composition of the charge may be illustrated by the following typical charge: 750 pounds of #2, #3, and #4 Buck anthracite, 400 pounds of pea and #1 Buck slate, 400 pounds of roasted mixed Western sulfid ores containing approximately 4% of sulfur, 25% of zinc oxid (ZnO) and 12% of lead oxid (PbO); and 200 pounds of unroasted sulfid ores running 20% of zinc oxid (ZnO) 10% lead oxid (PbO) and 20% of sulfur. The ingredients are thoroughly mixed before being charged into the furnace. This charge, which is intended for the production of a good colored and high bodied zinc-lead pigment, contains approximately 140 pounds of zinc oxid, 68 pounds of lead oxid and 66 pounds of sulfur. The four hundred pounds of roasted mixed sulfids, running 4% in sulfur, furnish about 16 pounds of sulfur; the 200 pounds of 20% unroasted sulfids about 40 pounds of sulfur; and the 950 pounds of coal running 1.1% of sulfur, about 10 pounds of sulfur. 48 pounds of lead oxid would be furnished by the 400 pounds of 12% roasted ores and 20 pounds from the 200 pounds of the 10% unroasted ores. The ratio of sulfur to lead oxid (PbO) in the charge is accordingly very near 6 of sulfur to 6 of PbO. The weights of the charge given above, plus about 5 to 8% of moisture to facilitate mixing, represent the charge for one-third of the furnace, that is to say that portion of the total charge which is spread over the portion of the grate back of one charge door.

The air pressure in the ash pits is then regulated to suit the needs of the particular mixture of ores being worked. The first hour or so after the furnace has been charged is consumed in driving off the water and heating up the bed of material. When the gases burning above the bed of the charge begin to show the zinc flame, the dampers on top of the furnace, which have closed off the exhaust to the drums up above, in order to prevent dust being sucked up, are now opened, and the production of the zinc-lead pigment is begun, the pigment being quickly withdrawn, after its formation, and being cooled in its passage through the pipes 7 (by radiation therefrom), any prolonged or objectionable overheating of the pigment being thereby prevented, so that no substantial change may take place in the desired physical properties of the fume. Residuum from previous fires is used to partially fill the charge doors 5 and the height of this residuum is regulated so as to admit a maximum amount of air to the furnace without cooling off the top of the bed too much. The charge doors are gradually closed up toward the end of the operation when the quantity of the gas and zinc to be oxidized by air other than that coming up through the grate becomes less and consequently the amount of cooling to be done at this point also becomes less. At the end of a suitable period, usually about six or eight hours after the time of drawing the previous fire, the ore is worked off. The dampers connecting with the exhaust system are then closed, the air cut off from the ash pits, and the clinkers removed through the charge doors. The furnace is now ready to be recharged and worked again in the manner above described.

The mixed zinc-lead pigment, produced in the manner described, consists principally of zinc oxid and lead sulfate or basic lead sulfates, and it is characterized, as above noted, by a superior whiteness and by superior body or oil-absorbing capacity and hiding power. In color, the product is generally characterized by its lack of any predominating pink or yellow tint.

When the pigment is "rubbed down" with linseed oil in the usual way with a pallette knife, the oil is taken up by the pigment in characteristic manner similar to the manner of absorbing oil displayed by well known zinc oxids of high quality, such as the XX brand of American process zinc oxid, and the Florence, Green, White, and Red Seal brands of the New Jersey Zinc Company. This manner of absorption can best be described as absorption of oil without display of "shortness"; that is, the material tends to spread out smoothly and uniformly on the pallette, and not to break off after the manner of short dough. This "shortness" is well illustrated when one rubs down basic sulfate of lead, basic carbonate of lead, or ground silex, ground barytes, etc.

The body or oil-absorbing capacity of the pigment is further indicated by the following viscosimeter test: 200 grams of the pigment are thoroughly mixed with 45 cc. of pure mechanically pressed linseed oil of acid number 4, and then ground by passing through a revolving six inch bur-stone paint mill. After standing an hour, 160 cc. of the linseed oil are added to the paste with thorough stirring and mixing. The paint resulting contains 52.6% oil and 47.4% pigment. The viscosity of this material at 20° C., as determined by the Stormer viscosimeter by the usual method of determining viscosity will not be below that of U. S. P. 95% glycerin at 20° C.

The body of the pigment is further indicated by the following running test: A portion of paint, made as described in the preceding paragraph and containing 52.6% of said oil and 47.4% pigment, is drawn off into a 10 cc. glass pipette having a one-sixteenth inch circular orifice. The orifice end of the pipette is cleaned off by wiping with a towel and five drops of the paint are allowed to fall on a fixed spot on a smooth glass plate, the tube being held in a vertical position and the orifice being one-half inch above the glass plate. The plate is then immediately placed in a vertical position and the paint allowed to run for ten minutes, at the end of which time the overall length is measured. The temperature at which the above procedure should be carried out is the normal laboratory temperature of 70° F. The pigment of the present invention will have an overall length of not more than two inches when tested in the manner described.

When subjected to a settling test, the following results are obtained: 5 grams of the pigment are put into a test tube three quarters inches inside diameter and eight inches high; 50 cc. of water then added and the tube stoppered and shaken for one minute. The pigment is then allowed to settle. The pigment will settle down to a height from the bottom of the test tube of not less than 3.6 inches in five minutes.

The pigment also responds to the following test for hiding power: Five grams of the pigment, .2 of a gram of high grade lamp black, and 1.20 grams of bleached linseed oil are mixed to a smooth uniform paste of uniform color throughout. The oil used may be determined by dropping from a point which has been standardized by counting the number of drops necessary to weigh 1.2 grams. The mixing shall be done by rubbing lightly with a spatula. All the sample lamp black and oil must be thoroughly incorporated. This paste shall be spread on a plate of high grade colorless optical glass, in a layer that will not transmit light. Our pigment will not be darker under this test than a sample of the well-known XX brand of American process zinc oxid when prepared in the same way and spread in a similar manner on the plate besides the sample. The two pastes should touch on the plate and the line of junction should be viewed through the back of the glass, when any difference in color will be easily seen.

Our product is of superior whiteness; that is to say, it is usually and preferably of approximating the white color of the XX brand of American process zinc oxid, but may in some instances have a slight pinkish tint, while nevertheless preserving the desired oil absorption, hiding-power and other characteristics hereinbefore specified.

By the expression "regulated sulfatizing and oxidizing atmosphere" as used in certain of the claims, we intend an atmosphere so regulated as not to materially sulfatize the zinc but sufficient to sulfatize the lead to the degree required in the recovery of the product as a white compound free from pronounced or objectionable pink tint and having improved body or oil-absorbing capacity and hiding power.

By the expression "without subsequent objectionable retention at elevated temperatures" we intend the prompt withdrawal of the fume from the region of elevated temperatures after its formation so that thereafter no substantial change may take place in the desired physical properties of the fume.

We claim:

1. The method of producing zinc-lead pigments from oxidized ores containing zinc and lead, which comprises volatilizing the zinc and lead from such ores at an elevated temperature and subjecting the same to a regulated sulfatizing and oxidizing atmosphere and thereby combining therewith sufficient sulfur and oxygen to sulfatize the lead to the required extent without materially sulfatizing the zinc, and without subsequent objectionable retention of the fume at elevated temperatures, to give a product of improved body or oil-absorbing capacity and of superior whiteness and hiding power.

2. The method of producing zinc-lead pigments from oxidized ores containing zinc and lead, which comprises volatilizing the zinc and lead from such ores and combining with the resulting fume, at the time of its production, sufficient sulfur trioxid to give a product of improved body or oil-absorbing capacity and of superior whiteness and hiding power.

3. The method of producing zinc-lead pigments from oxidized ores containing zinc and lead, which comprises volatilizing the zinc and lead from such ores at an elevated temperature and combining therewith under oxidizing conditions sufficient sulfur trioxid to sulfatize the lead to the required extent, without materially sulfatizing the zinc, and without subsequent objectionable retention of the fume at elevated temperatures, to form a product of improved body or oil-absorbing capacity and of superior whiteness and hiding power.

4. The method of producing zinc-lead pigments from oxidized ores containing zinc and lead, which comprises volatilizing the zinc and lead from such ores, maintaining above the charge from which the metals are volatilized a regulated sulfatizing and oxidizing atmosphere and thereby combining with the volatilized constituents sufficient sulfur trioxid to sulfatize the lead to the required extent, without materially sulfatizing the zinc, and promptly withdrawing and cooling the resulting fume, whereby a product of improved body and oil-absorbing capacity and hiding power and of superior whiteness is produced.

5. The method of producing zinc-lead pigments from oxidized ores containing zinc and lead, which comprises volatilizing the zinc and lead at an elevated temperature from a charge containing sufficient sulfur compounds to maintain a regulated sulfatizing atmosphere throughout the operation, and combining the volatilized zinc and lead under oxidizing conditions and without subsequent objectionable retention of the fume at elevated temperatures with sufficient sulfur trioxid to form a product of improved body or oil-absorbing capacity and hiding power and of superior whiteness.

6. The method of producing zinc-lead pigments from oxidized ores containing zinc and lead, which comprises forming a charge containing from about three to eight parts of sulfur to six parts of lead oxid (PbO), volatilizing the lead and zinc from such charge at an elevated temperature and subjecting the same to oxidizing and sulfatizing conditions throughout the operation, and withdrawing the product without subsequent objectionable retention at elevated temperatures, thereby forming a product of improved body or oil-absorbing capacity and hiding power and of superior whiteness.

7. The method of producing zinc-lead pigments from oxidized ores containing zinc and lead, which comprises forming a charge containing about equal amounts of sulfur and of lead oxid (PbO), volatilizing the lead and zinc from such charge at an elevated temperature and subjecting the same to oxidizing, and sulfatizing conditions throughout the operation, and withdrawing the product without subsequent objectionable retention at elevated temperatures and thereby forming a product of improved body or oil-absorbing capacity and hiding power and of superior whiteness.

8. The method of producing zinc-lead pigments from oxidized ores containing zinc and lead, which comprises forming a charge containing partially roasted sulfid ores, volatilizing the lead and zinc from such charge at an elevated temperature and combining therewith under oxidizing conditions and without subsequent objectionable retention of the fumes at elevated temperatures, sufficient sulfur trioxid to form a product of improved body or oil-absorbing capacity and hiding power and of superior whiteness.

9. The method of producing zinc-lead pigments from oxidized ores containing zinc and lead, which comprises forming a charge containing roasted ore and unroasted ore, said charge containing from about three to eight parts of sulfur to six parts of lead oxid (PbO), volatilizing the lead and zinc from such charge at an elevated temperature and combining therewith under oxidizing conditions and without subsequent objectionable retention of the fume at elevated temperatures sufficient sulfur trioxid to form a product of improved body or oil-absorbing capacity and hiding power and of superior whiteness.

10. The method of producing zinc-lead pigments from oxidized ores containing zinc and lead, which comprises volatilizing the zinc and lead from such ores and subjecting the same to a regulated sulfatizing and oxidizing atmosphere throughout the operation, and withdrawing and rapidly cooling the product immediately after its formation, and thereby producing a product of improved body or oil-absorbing capacity and hiding power and of superior whiteness.

11. The method of producing zinc-lead pigments of improved body or oil-absorbing capacity from a charge comprising oxidized ores containing zinc and lead, which comprises volatilizing the zinc and lead from the charge, and combining therewith sufficient sulfur and oxygen, in a regulated sulfatizing and oxidizing atmosphere, to sulfatize the lead to the required extent without materially sulfatizing the zinc, the fume thus formed being thereupon withdrawn from such exposure to elevated temperatures as would substantially change its desired oil-absorbing properties and hiding power.

12. As a new article of manufacture, a zinc-lead pigment of improved body or oil-absorption capacity and of superior whiteness, said pigment absorbing oil without display of shortness, in a manner similar to that displayed by XX brand of American process zinc oxid.

13. As a new article of manufacture, a white zinc-lead pigment responding to the hereinbefore described rubbing down test, running test, and hiding power test.

14. As a new article of manufacture, a zinc-lead pigment of improved body or oil-absorption capacity and of superior whiteness, said pigment absorbing oil without display of shortness in a manner similar to that displayed by XX brand of American process zinc oxid, and containing about 65% to 97% of zinc oxid.

15. As a new article of manufacture, a white zinc-lead pigment responding to the hereinbefore described rubbing down test, running test, and hiding power test, and containing about 65% to 97% of zinc oxid.

In testimony whereof we affix our signatures.

JAMES A. SINGMASTER.
FRANK G. BREYER.